United States Patent
Zhou

(10) Patent No.: US 9,978,152 B2
(45) Date of Patent: May 22, 2018

(54) METHOD AND SYSTEM FOR WAFER ALIGNMENT

(71) Applicant: Raintree Scientific Instruments (Shanghai) Corporation, Shanghai (CN)

(72) Inventor: Jian Zhou, San Jose, CA (US)

(73) Assignee: Raintree Scientific Instruments (Shanghai) Corporation, Shanghai (CN)

( * ) Notice: Subject to any disclaimer, the term of this patent is extended or adjusted under 35 U.S.C. 154(b) by 13 days.

(21) Appl. No.: 14/293,506

(22) Filed: Jun. 2, 2014

(65) Prior Publication Data

US 2015/0125069 A1 May 7, 2015

(30) Foreign Application Priority Data

Nov. 6, 2013 (CN) .......................... 2013 1 0548035

(51) Int. Cl.
*G06K 9/00* (2006.01)
*G06T 7/33* (2017.01)

(52) U.S. Cl.
CPC .... *G06T 7/337* (2017.01); *G06T 2207/30148* (2013.01)

(58) Field of Classification Search
None
See application file for complete search history.

(56) References Cited

U.S. PATENT DOCUMENTS

| 7,433,509 B1 | 10/2008 | Zhou et al. | |
| 2007/0288219 A1* | 12/2007 | Zafar | G03F 1/84 703/14 |
| 2008/0013089 A1* | 1/2008 | Ishii | G03F 9/7011 356/400 |

* cited by examiner

*Primary Examiner* — Fred Hu
(74) *Attorney, Agent, or Firm* — Finnegan, Henderson, Farabow, Garrett & Dunner LLP

(57) ABSTRACT

A method for a system to generate a recipe for performing wafer alignment, includes: generating first and second alignment data sets, the first alignment data set including image information regarding a first site on a wafer and coordinates of characteristic points at the first site, and the second alignment data set including image information regarding a second site different than the first site on the wafer and coordinates of characteristic points at the second site; and saving the generated first and second alignment data sets as a recipe for wafer alignment; wherein the generating of the first alignment data set includes: selecting, as the first site, a site including a characteristic pattern on the wafer; determining first and second characteristic points at the selected site; and recording coordinates of the determined first and second characteristic points.

8 Claims, 6 Drawing Sheets

METHOD AND SYSTEM FOR WAFER ALIGNMENT

RELATED APPLICATIONS

This application is based upon and claims priority from Chinese Patent Application No. 201310548035.4, filed Nov. 6, 2013, the entire contents of which are incorporated herein by reference.

TECHNICAL FIELD

This disclosure generally relates to semiconductor manufacturing and, more particularly, to a method and system for wafer alignment.

BACKGROUND

With the rapid development and wide application of integrated circuits, the demand for wafers, which are basic raw material for the integrated circuits, has increased. Wafer processing and inspection are important in semiconductor manufacturing. Due to the requirement for precision of the integrated circuits, precision processing and accurate inspection are desired for wafers.

A wafer generally needs to be repeatedly placed onto a processing stage of a system of wafer processing and inspection. This may cause a position offset for each wafer placement on the processing stage and, thus, affect accuracy of the wafer processing and inspection. To reduce the position offset, when the wafer is placed onto the processing stage, the system first performs alignment on the wafer before performing the actual wafer processing and inspection.

Conventionally, the system performs wafer alignment based on characteristic patterns selected on the wafer. However, in certain wafer processing steps, such as chemical mechanical polishing, the selected characteristic patterns may be significantly changed, such that the characteristic patterns may not be subsequently identified on the wafer. For example, FIG. 1 shows images 1-1, 1-2, 1-3, 1-4, 1-5, and 1-6 of a same site 100 on a wafer at various stages in a conventional semiconductor manufacturing process. As shown in FIG. 1, characteristic patterns at the site 100 are significantly changed in the manufacturing process.

SUMMARY

According to a first aspect of the present disclosure, there is provided a method for a system to generate a recipe for performing wafer alignment, comprising: generating first and second alignment data sets, the first alignment data set including image information regarding a first site on a wafer and coordinates of characteristic points at the first site, and the second alignment data set including image information regarding a second site different than the first site on the wafer and coordinates of characteristic points at the second site; and saving the generated first and second alignment data sets as a recipe for wafer alignment; wherein the generating of the first alignment data set includes: selecting, as the first site, a site including a characteristic pattern on the wafer; determining first and second characteristic points at the selected site; and recording coordinates of the determined first and second characteristic points.

According to a second aspect of the present disclosure, there is provided a method for a system to perform alignment on a wafer, comprising: loading a recipe including an original alignment data set, the original alignment data set including image information regarding a site on the wafer and original coordinates of characteristic points at the site; identifying a site on the wafer that matches the image information; identifying characteristic points at the identified site based on the original coordinates and determining current coordinates of the identified characteristic points; and determining a conversion relationship between the current coordinates and the original coordinates.

According to a third aspect of the present disclosure, there is provided a method for a system to perform alignment on a wafer, comprising: loading a recipe including a plurality of alignment data sets each including image information regarding a corresponding site on the wafer and original coordinates of characteristic points at the corresponding site; identifying a site on the wafer that matches the image information in one of the alignment data sets; updating, after the identifying, a sequence of the alignment data sets in the recipe; identifying characteristic points at the identified site based on the original coordinates in the one of the alignment data sets, and determining current coordinates of the identified characteristic points; and determining a conversion relationship between the current coordinates and the original coordinates in the one of the alignment data sets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
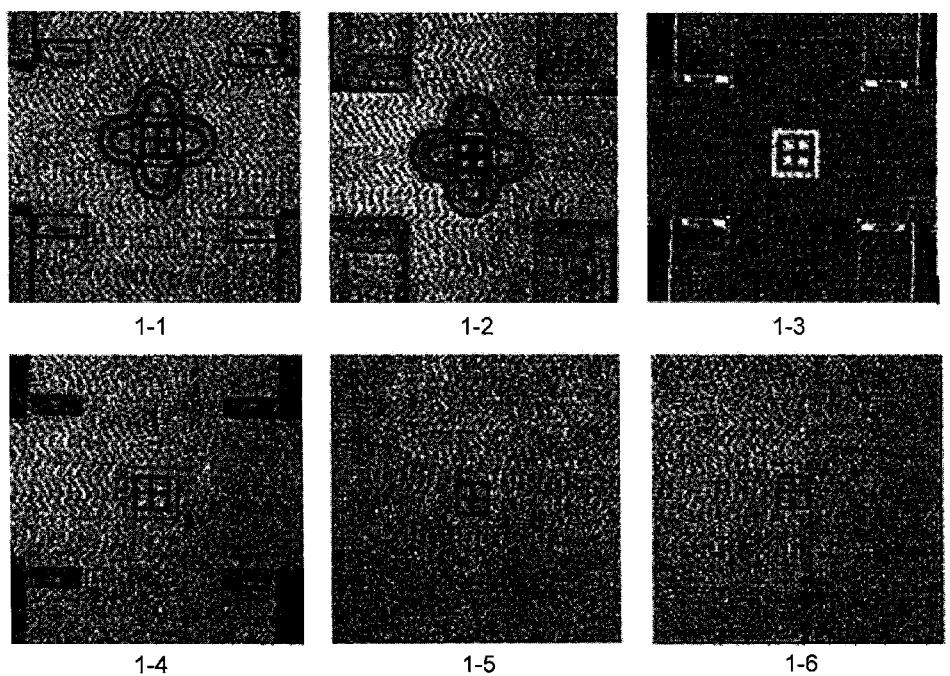
FIG. 1 shows images of a site on a wafer at various stages in a conventional semiconductor manufacturing process.
Figure 2:
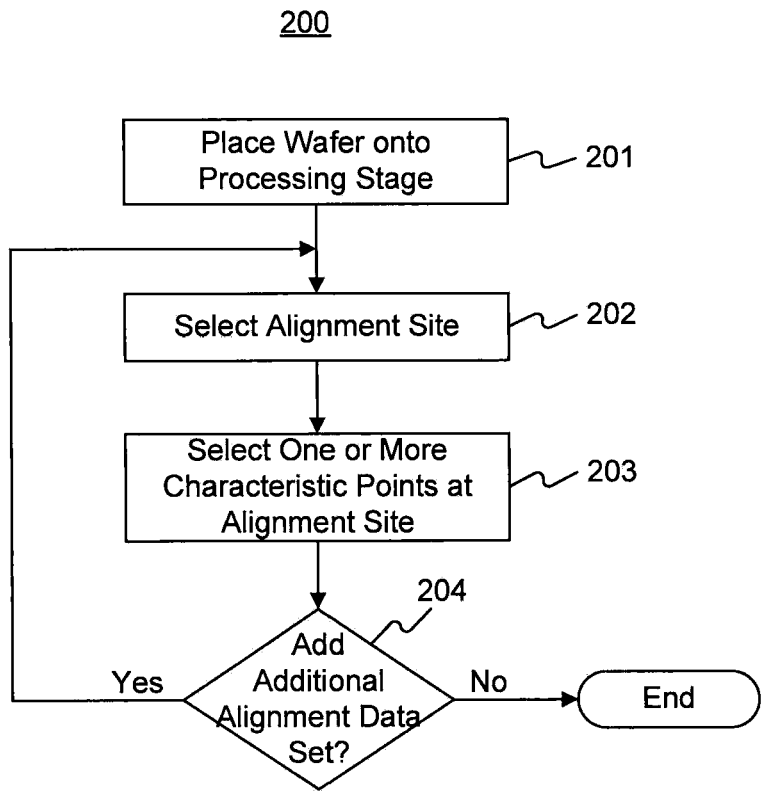
FIG. 2 is a flowchart of a method for a system to generate a recipe for wafer alignment, according to an exemplary embodiment.

FIG. 2 is a flowchart of a method 200 for a system to generate a recipe for wafer alignment, according to an exemplary embodiment. Referring to FIG. 2, the system places a wafer to be processed onto a processing stage (201), which fixes the wafer, e.g., using a fixture. The system then selects on the wafer an alignment site containing a characteristic pattern for wafer alignment (202).

In exemplary embodiments, the system performs a search on the wafer to select the alignment site through a pattern recognition device, such as a microscopy camera. In one exemplary embodiment, the system is manually operated to search for the alignment site. After a site containing a characteristic pattern is displayed on the pattern recognition device and selected by a user, the system sets the selected site as the alignment site, and records image information of the alignment site for subsequent use in pattern searching and matching. For example, the image information may be an image of the alignment site, or an image element extracted from the image of the alignment site, such as a length of a line, a radian of a curve, an angle between two lines, etc.

Figure 3:
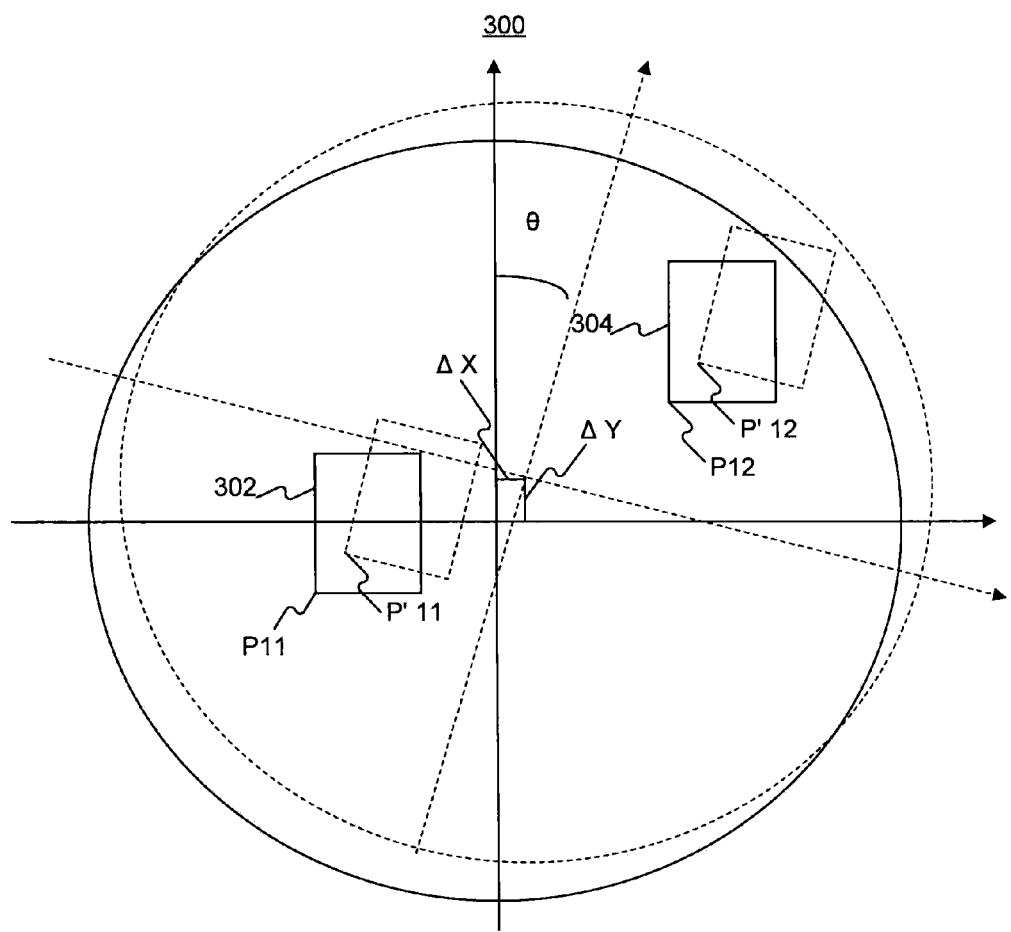
FIG. 3 is a schematic diagram of an alignment site on a wafer, according to an exemplary embodiment.

FIG. 3 is a schematic diagram of an alignment site 300 selected on a wafer that contains a characteristic pattern, according to an exemplary embodiment. Referring to FIG. 3, the alignment site 300 contains a first die 302 and a second die 304. In the illustrated embodiment, because the first die 302 and the second die 304 both have a shape of rectangle and are located at different positions on the wafer with a distance therebetween, the alignment site 300 is considered to contain a rich characteristic pattern.

In exemplary embodiments, the system automatically searches for the alignment site containing a characteristic pattern on the wafer. For example, the system determines a characteristic value for a first site on the wafer. If the system further determines that the characteristic value determined for the first site is larger than a preset threshold, the system determines the first site to be the alignment site containing the characteristic pattern. If the system further determines that the characteristic value determined for the first site is not larger than the threshold, the system continues to search for a next site on the wafer.

For example, the characteristic value can indicate a degree of characteristic pattern at the first cite, i.e., a difficulty degree for a characteristic pattern at the first cite being recognized. In the illustrated embodiment, a lower characteristic value indicates that a characteristic pattern is relatively difficult to be recognized, and a higher characteristic value indicates that a characteristic pattern is relatively easy to be recognized. As a result, for example, a site containing a pattern of three rectangles has a greater characteristic value than another site containing a pattern of one rectangle. Also for example, a site containing a pattern of a pentagram has a greater characteristic value than another site containing a pattern of a quadrilateral. In one exemplary embodiment, the characteristic value for a pattern is set by the user.

In exemplary embodiments, the system selects the alignment site containing a characteristic pattern close to a center of the wafer. For example, the system performs the search for an alignment site starting from the center of the wafer. If the system selects an alignment site at the center of the wafer, it reduces a time for the search, and increases a speed for the selection of the alignment site.

Referring to FIGS. 2 and 3, in exemplary embodiments, the system further selects one or more characteristic points at the alignment site (203). For example, the system further selects at least two characteristic points at the alignment site. A characteristic point is a point on the wafer that has a certain character for the point to be relatively easily identified, and is generally selected from an alignment site. For example, points on horizontal or perpendicular edges of different dies, or location marks of different dies, can be selected as characteristic points. Also for example, if the alignment site has a pattern of a triangle, the three vertices of the triangle can be selected as the characteristic points. In the illustrated embodiment in connection with FIG. 3, the system selects vertices P11 and P12 of the rectangles corresponding to the first and second dies 302 and 304, respectively, as the characteristic points. The characteristic points may be automatically selected by the system through the pattern recognition device, or manually selected by the user.

In one exemplary embodiment, when the system selects characteristic points at the alignment site containing a characteristic pattern, the system selects at least one characteristic point close to the center of the wafer, and selects at least one characteristic point close to an edge of the wafer.

In one exemplary embodiment, the system selects two characteristic points at the alignment site with a distance between the two characteristic points to be as large as possible. The larger the distance is between the two characteristic points, the smaller a relative error resulting from measuring a skew angle between the wafer and the processing stage.

In exemplary embodiments, after the characteristic points are selected, the system determines coordinates for each of the selected characteristic points through the pattern recognition device, and records the coordinates of the selected characteristic points. Accordingly, the system generates an alignment data set including the recorded image information of the alignment site and the recorded coordinates of the characteristic points. The system further determines if an additional alignment data set needs to be added (204).

For example, if the system determines that a current number of alignment data sets is smaller than two, the system repeats step 202 to add an additional alignment data set. As noted above, during the processing of a wafer, characteristic patterns on the wafer may be changed due to, e.g., the chemical mechanical polishing. Using at least two alignment data sets will improve accuracy for pattern searching and matching.

If the system determines that the current number of alignment data sets is larger than two, the method 200 ends. Alternatively, a number of more than two alignment data sets can be used based on user need. For example, a threshold is preset for the number of alignment data sets. If the system determines that the current number of alignment data sets is smaller than the preset threshold, the system repeats step 202 to add an additional alignment data set, until the number of alignment data sets reaches the threshold. In addition, in the illustrated embodiment, different alignment data sets correspond to different sites on the wafer, thereby to improve accuracy for wafer alignment.

The system saves the generated alignment data sets in a file, referred to hereafter as a recipe, for subsequent wafer alignment. In exemplary embodiments, the system saves the alignment data sets in a sequence according to a predetermined rule. During the wafer alignment, the system invokes the alignment data sets according to the same sequence. For example, the system saves the alignment data sets in a sequence of the alignment data sets being generated. As a result, e.g., a first generated alignment data set is in the front of the alignment data sets, and is first invoked during the wafer alignment.

Figure 4:
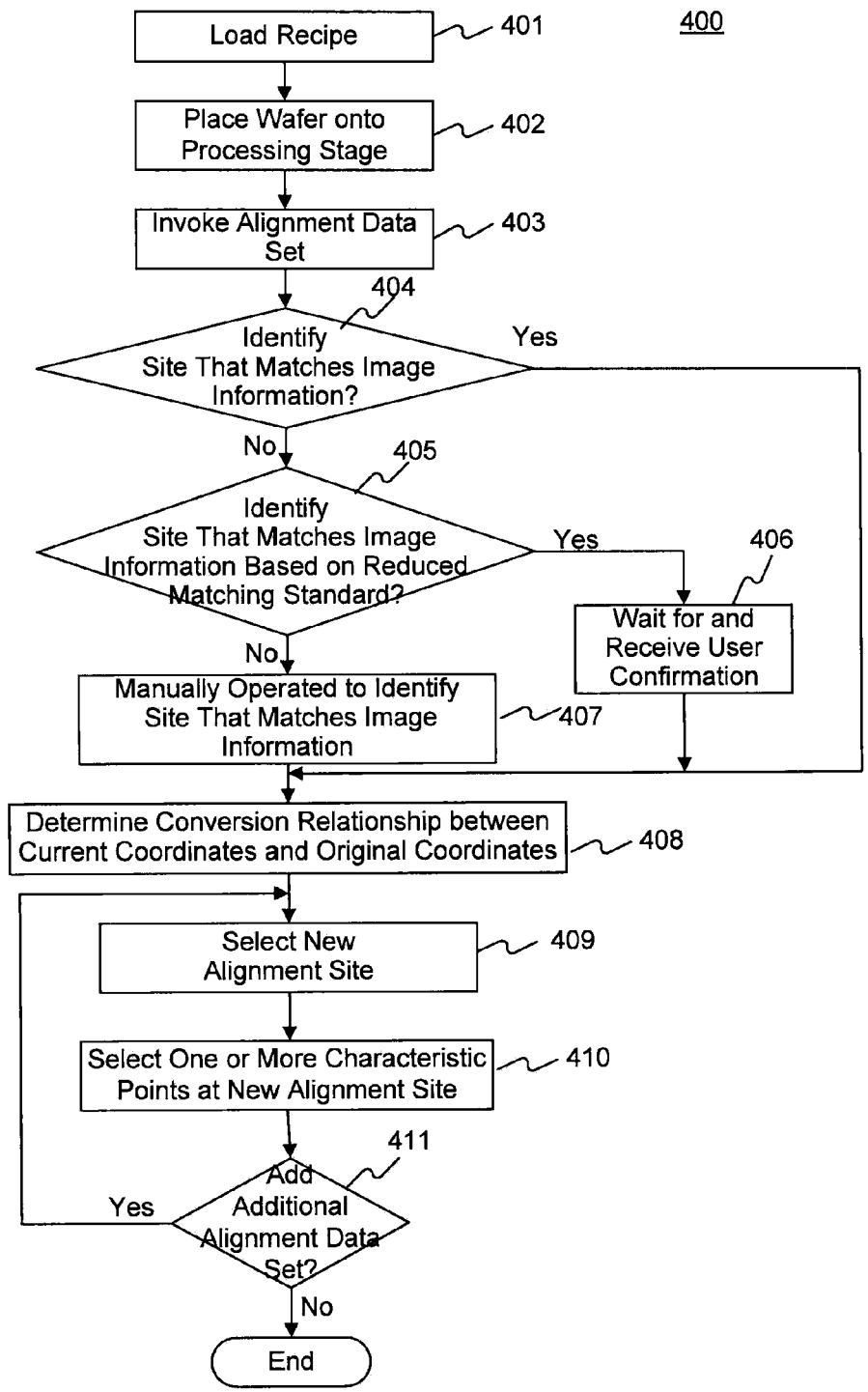
FIG. 4 is a flowchart of a method for a system to add a new alignment data set in a recipe for wafer alignment, according to an exemplary embodiment.

FIG. 4 is a flowchart of a method 400 for the system to add a new alignment data set in a recipe for wafer alignment, according to an exemplary embodiment. For example, the recipe for wafer alignment may be the recipe saved in the method 200 (FIG. 2) and includes at least one original alignment data set.

Referring to FIG. 4, the recipe for wafer alignment is loaded into the system (401). The system also places the wafer to be processed onto the processing stage (402), which fixes the wafer through the fixture. The system further invokes an alignment data set from the recipe, e.g., the first alignment data set in the recipe, by exporting the image information and the coordinates in the alignment data set. The system further tries to identify on the wafer a site that matches the exported image information (404).

In one exemplary embodiment, through the pattern recognition device, the system performs a search on the wafer for a site that matches the exported image information. For example, the system performs the search by comparing an image of a site on the wafer with an image in the exported image information, or by comparing an image element in the image of the site with an image element in the exported image information, such as a length of a line, a radian of a curve, an angle between two lines.

In one exemplary embodiment, the system determines a similarity value representing a similar degree between the image of the site on the wafer and the image in the exported image information, or between the image element in the image of the site on the wafer and the image element in the exported image information. In addition, a similarity threshold is preset, e.g., to be 80%. If the system further determines that the similarity value is larger than the similarity threshold, the system determines that the site matches the exported image information from the alignment data set. If the system further determines that the similarity value is smaller than the similarity threshold, the system determines that the site does not match the exported image information from the alignment data set.

In one exemplary embodiment, if the system does not identify a site that matches the exported image information, the system determines if the recipe includes a next alignment data set. If the system determines that the recipe includes a next alignment data set, the system repeats step 403.

In exemplary embodiments, if the system does not identify a site that matches the exported image information (404—No), the system reduces a matching standard by, e.g., reducing the similarity threshold, and searches for a site on the wafer that matches the exported image information based on the reduced matching standard (405); otherwise (404—Yes), the system performs step 408. In the illustrated embodiment, after the wafer is processed, characteristic patterns on the wafer are changed. Accordingly, the system reduces the similarity threshold to search for a site that matches the exported image information. If the system determines that the similarity value is larger than the reduced similarity threshold and thereby determines that the site matches the exported image information (405—Yes), the system further identifies characteristic points corresponding to the alignment data set, and also waits for and receives a confirmation from the user to confirm the system's determination (406).

If the system does not identify a site that matches the exported image information (405—No), or if the system does not receive the confirmation from the user, the system prompts a user operation to manually identify a site that matches the exported image information (407), and also to identify characteristic points corresponding to the alignment data set.

In exemplary embodiments, after identifying the site that matches the exported image information and the characteristic points, the system determines current coordinates of the characteristic points. The system further calculates location offsets between the current coordinates of the characteristic points and their original coordinates in the alignment data set, and determines a conversion relationship between the current coordinates and the original coordinates (408).

For example, in the embodiment illustrated in connection with FIG. 3, the solid line represents an original position of the wafer on the processing stage when the recipe is generated, and the dotted line represents a current position of the wafer on the processing stage. As shown in FIG. 3, there is a position offset between the original position and the current position, and the characteristic points P11 and P12 in the original position correspond to characteristic points P'11 and P'12, respectively, in the current position. Assuming that P 11 has coordinates of (X, Y) and P'11 has coordinates of (X', Y'), and a rotation angle between the current position and the original position is θ, the system determines a conversion relationship between the current coordinates and the original coordinates as follows:

$$X' = X*\cos\theta + Y*\sin\theta + \Delta X, \quad \text{equation (1)}$$

$$Y' = -X*\sin\theta + *\cos\theta + \Delta Y, \quad \text{equation (2)}$$

where ΔX is a position offset of the characteristic point P11 along the x axis, ΔY is a position offset of the characteristic point P11 along the y axis, and "*" represents a multiplication operation. Based on equations (1) and (2), the system can calculate current coordinates based on original coordinates of any characteristic point in the alignment data set.

In exemplary embodiments, the system further selects on the wafer a new alignment site containing a characteristic pattern (409). The system performs step 409 in a similar way to step 202 (FIG. 2). In addition, the new alignment site contains a different characteristic pattern than the characteristic pattern corresponding to the exported image information from the alignment data set.

In exemplary embodiments, the system further selects one or more characteristic points at the new alignment site (410). The system performs step 410 in a similar way to step 203 (FIG. 2). In addition, the system calculates original coordinates of the characteristic points at the new alignment site based on their current coordinates and the determined conversion relationship, i.e., equations (1) and (2). As a result, the coordinates of the characteristic points at the new alignment site and the exported coordinates from the alignment data set are in the same coordinate system.

In exemplary embodiments, the system further saves a new alignment data set corresponding to the new alignment site in the recipe, the new alignment data set including image information of the new alignment site and the original coordinates of the characteristic points at the new alignment site, and determines if an additional new alignment data set needs to be added (411). The system performs step 411 in a similar way to step 204 (FIG. 2). If it is determined that an additional new alignment data set needs to be added, the system repeat step 409; otherwise, the method 400 ends.

Figure 5:
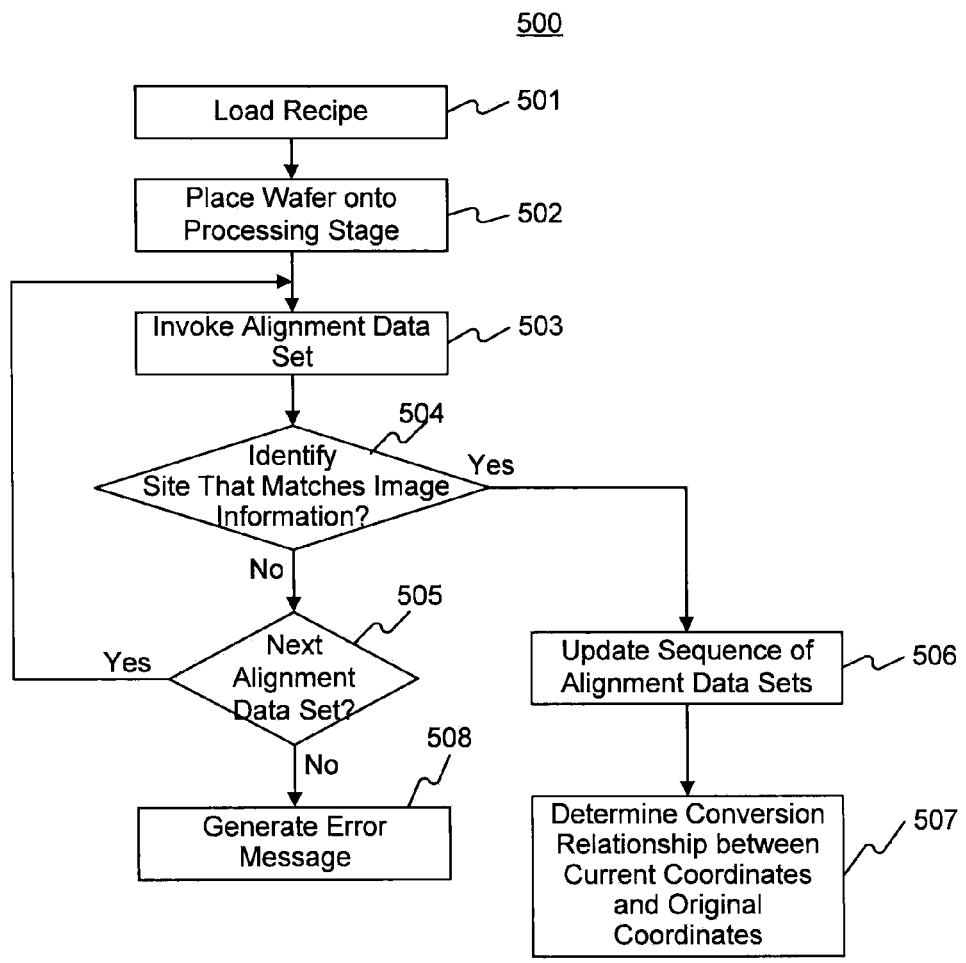
FIG. 5 is a flowchart of a method for a system to perform wafer alignment, according to an exemplary embodiment.

FIG. 5 is a flowchart of a method 500 for the system to perform wafer alignment, according to an exemplary embodiment. Referring to FIG. 5, a recipe including at least first and second alignment data sets is loaded into the system (501). For example, the recipe may be generated using the method 200 (FIG. 2) or the method 400 (FIG. 4). The system also places a wafer to be processed onto the processing stage (502), which fixes the wafer, e.g., using a fixture. The system further invokes an alignment data set from the recipe (503), e.g., the first alignment data set in the recipe, by exporting the image information and the coordinates in the alignment data set. The system further tries to identify on the wafer a site that matches the exported image information (504).

In one exemplary embodiment, through the pattern recognition device, the system performs a search on the wafer for a site that matches the exported image information. For example, the system performs the search by comparing an image of a site on the wafer with an image in the exported image information, or by comparing an image element in the image of the site with an image element in the exported image information, such as a length of a line, a radian of a curve, an angle between two lines.

In one exemplary embodiment, the system determines a similarity value representing a similar degree between the image of the site on the wafer and the image in the exported image information, or between the image element in the image of the site on the wafer and the image element in the exported image information. In addition, a similarity threshold is preset, e.g., to be 80%. If the system further determines that the similarity value is larger than the similarity threshold, the system determines that the site matches the exported image information from the alignment data set. If the system further determines that the similarity value is smaller than the similarity threshold, the system determines that the site does not match the exported image information from the first alignment data set.

If the system does not identify a site that matches the exported image information (504—No), the system determines if the recipe includes a next alignment data set (505). If the system determines that the recipe includes a next alignment data set (505—Yes), the system repeats step 503. If the system determines that the recipe does not include a next alignment data set (505—No), the system generates an error message to the user (508).

If the system identifies a site that matches the exported image information (504—Yes), the system also identifies characteristic points at the site and updates a sequence of the alignment data sets in the recipe (506). For example, the system updates the sequence of the alignment data sets by setting the alignment data set based on which the system identifies the matching site as the first alignment data set in the recipe, and moves each of the alignment data sets in the recipe that is originally before that alignment data set to its next position. In addition, the system saves the alignment data sets in the updated sequence in the recipe.

The system further calculates location offsets between current coordinates of the characteristic points and their original coordinates in the alignment data set, and determines a conversion relationship between the current coordinates and the original coordinates (507), similar to step 408 (FIG. 4). For example, the determined conversion relationship is equations (1) and (2). Accordingly, the system can determine current coordinates of all points on the wafer based on the conversion relationship. For example, a testing point Q on the wafer has original coordinates of (a, b). If the testing point Q does not have characteristics, it is generally difficult to identify the testing point Q using the pattern recognition device. Based on the conversion relationship, however, the system can determine current coordinates of the testing point Q, thereby facilitating the testing process.

Figure 6:
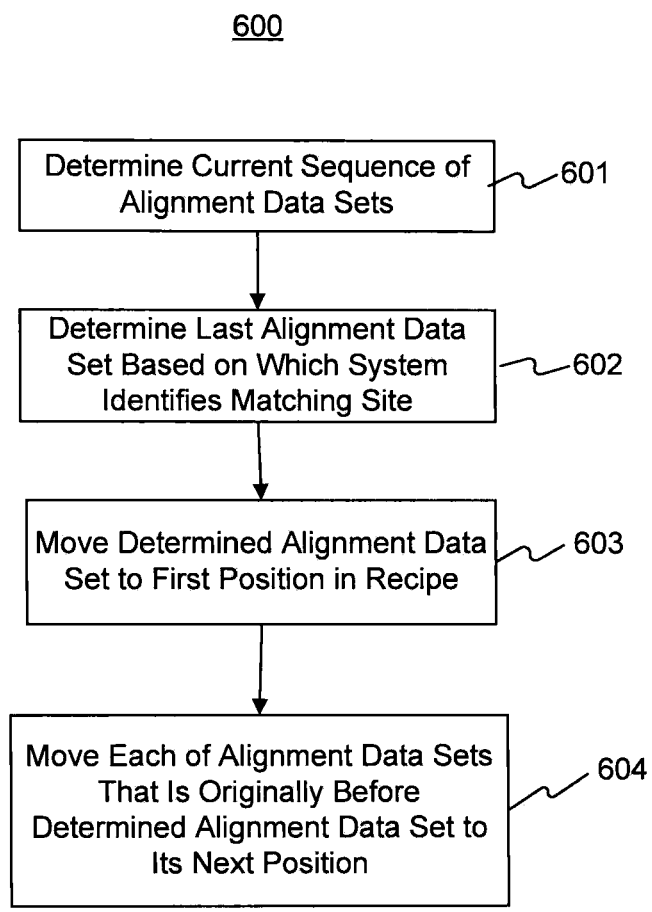
FIG. 6 is a flowchart of a method for a system to update a sequence of alignment data sets in a recipe, according to an exemplary embodiment.

FIG. 6 is a flowchart of a method 600 for the system to update a sequence of alignment data sets in a recipe, according to an exemplary embodiment. Referring to FIG. 6, the system determines a current sequence of the alignment data sets in the recipe (601). The system also determines an alignment data set as the last alignment data set based on which the system identifies a matching site (602). The system then moves the determined alignment data set to the first position in the recipe (603), and moves each of the alignment data sets in the recipe that is originally before the determined alignment data set to its next position (604).

For example, the system determines that the current sequence of the alignment data sets in the recipe is Alignment Data Set (ADS) 1, ADS 2, ADS 3, and ADS 4 (601). The system sequentially invokes the alignment data sets in the recipe. In the illustrated embodiments, the system does not identify a site on the wafer matching ADS 1 and ADS 2, but identifies a site on the wafer matching ADS 3. Accordingly, the system considers ADS 3 as the last alignment data set based on which the system successfully identifies a matching site (602). The system then moves ADS 3 to the first position in the recipe (603), and moves each of the alignment data sets in the recipe that is originally before ADS 3, i.e., ADS 1 and ADS 2, to its next position (604). As a result, the updated sequence of the alignment data sets in the recipe is ADS 3, ADS 1, ADS 2, and ADS 4. When the system loads the recipe a next time, the system will first invoke ADS 3.

Other embodiments of the invention will be apparent to those skilled in the art from consideration of the specification and practice of the embodiments disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a system to perform alignment on a wafer, comprising:
   loading a recipe including an original alignment data set, the original alignment data set including image information regarding a site on the wafer and original coordinates of characteristic points at the site;
   identifying a site on the wafer that matches the image information;
   identifying characteristic points at the identified site based on the original coordinates and determining current coordinates of the identified characteristic points; and
   determining a conversion relationship between the current coordinates and the original coordinates, wherein the identifying of the site includes:
   (i) determining a similarity value between an image of a first site on the wafer and the image information in the original alignment data set;
   (ii) determining if the similarity value is larger than a preset threshold;
   (iii) identifying the first site as the site that matches the image information, if it is determined that the similarity value is larger than the preset threshold; and
   (iv) reducing, but not increasing, the preset threshold, if it is determined that the similarity value is smaller than the preset threshold, and searching for a different first site on the wafer that matches the image information by repeating operations (i), (ii), and (iii) based on the reduced preset threshold.

2. The method of claim 1, further comprising:
selecting a new site on the wafer;
determining current coordinates of first and second characteristic points at the new site;
determining original coordinates of the first and second characteristic points based on the current coordinates of the first and second characteristic points and the conversion relationship; and
saving image information regarding the new cite and the determined original coordinates as a new alignment data set into the recipe.

3. The method of claim 1, further comprising:
determining if the similarity value is larger than the reduced preset threshold;
waiting for a user confirmation, if it is determined that the similarity value is larger than the reduced preset threshold; and
prompting a user operation to identify the site that matches the image information, if it is determined that the similarity value is smaller than the preset threshold.

4. The method of claim 1, wherein the determining of the conversion relationship comprises determining the conversion relationship as follows:

$$X'=X*\cos\theta+Y*\sin\theta+\Delta X,$$

$$Y'=-X*\sin\theta+Y*\cos\theta+\Delta Y,$$

wherein (X, Y) are the original coordinates of a first characteristic point in the original alignment data set, (X', Y') are the current coordinates of an identified characteristic point corresponding to the first characteristic point, θ is a rotation angle, ΔX and ΔY are position offsets, and "*" represents a multiplication operation.

5. The method of claim 2, wherein the saving comprises:
saving the new alignment data set into the recipe according to a predetermined rule.

6. A method for a system to perform alignment on a wafer, comprising:
loading a recipe including a plurality of alignment data sets each including image information regarding a corresponding site on the wafer and original coordinates of characteristic points at the corresponding site;
identifying a site on the wafer that matches the image information in one of the alignment data sets;
updating, after the identifying, a sequence of the alignment data sets in the recipe;
identifying characteristic points at the identified site based on the original coordinates in the one of the alignment data sets, and determining current coordinates of the identified characteristic points; and
determining a conversion relationship between the current coordinates and the original coordinates in the one of the alignment data sets,
wherein the identifying of the site includes:
(i) determining a similarity value between an image of a first site on the wafer and the image information in the one of the alignment data sets;
(ii) determining if the similarity value is larger than a preset threshold;
(iii) identifying the first site as the site that matches the image information, if it is determined that the similarity value is larger than the preset threshold; and
(iv) reducing, but not increasing, the preset threshold, if it is determined that the similarity value is smaller than the preset threshold, and searching for a different first site on the wafer that matches the image information by repeating operations (i), (ii), and (iii) based on the reduced preset threshold.

7. The method of claim 6, wherein if the system fails to identify a site on the wafer that matches the image information in a first one of the alignment data sets, the method further comprises:
determining if the recipe includes a next alignment data set;
if it is determined that the recipe includes the next alignment data set, identifying a site on the wafer that matches the image information in the next alignment data set; and
if it is determined that the recipe does not include a next alignment data set, generating an error message.

8. The method of claim 6, wherein the updating of the sequence comprises:
moving the one of the alignment data sets to a first position in the recipe;
moving each of the alignment data sets in the recipe that is originally before the one of the alignment data sets to a next position; and
saving as the recipe the alignment data sets in the updated sequence.

* * * * *